United States Patent
Kim (10) Patent No.: US 10,653,506 B2
(45) Date of Patent: May 19, 2020

(54) IMPLANT UNIT

(71) Applicant: Kwang Seob Kim, Fullerton, CA (US)

(72) Inventor: Kwang Seob Kim, Fullerton, CA (US)

(*) Notice: Subject to any disclaimer, the term of this patent is extended or adjusted under 35 U.S.C. 154(b) by 0 days.

(21) Appl. No.: 14/987,873

(22) Filed: Jan. 5, 2016

(65) Prior Publication Data

US 2016/0193017 A1 Jul. 7, 2016

(30) Foreign Application Priority Data

Jan. 5, 2015 (KR) .................. 10-2015-0000784
Jan. 21, 2015 (KR) .................. 10-2015-0010147

(51) Int. Cl.
A61C 8/00 (2006.01)

(52) U.S. Cl.
CPC ............ *A61C 8/0078* (2013.01); *A61C 8/006* (2013.01); *A61C 8/0056* (2013.01); *A61C 8/0062* (2013.01); *A61C 8/0063* (2013.01); *A61C 8/0068* (2013.01); *A61C 8/0069* (2013.01); *A61C 8/0086* (2013.01); *A61C 2201/007* (2013.01)

(58) Field of Classification Search
CPC ... A61C 8/0078; A61C 8/0056; A61C 8/0057; A61C 8/0071; A61C 8/0069; A61C 8/006
See application file for complete search history.

(56) References Cited

U.S. PATENT DOCUMENTS

| | | | | |
|---|---|---|---|---|
| 3,934,347 A * | 1/1976 | Lash | ...................... | A61C 8/0001 433/173 |
| 4,731,085 A * | 3/1988 | Koch | ..................... | A61C 8/0018 433/173 |
| 4,957,437 A * | 9/1990 | Shimura | ................. | A61C 8/005 433/169 |
| 5,015,186 A * | 5/1991 | Detsch | .................. | A61C 8/0001 433/173 |
| 5,246,370 A * | 9/1993 | Coatoam | ................... | A61C 8/00 433/173 |
| 5,302,126 A * | 4/1994 | Wimmer | ............... | A61C 8/0022 433/173 |
| 5,437,551 A * | 8/1995 | Chalifoux | ............ | A61C 8/0018 433/172 |
| 5,468,150 A * | 11/1995 | Brammann | ............ | A61C 8/005 433/169 |
| 5,674,072 A * | 10/1997 | Moser | ................... | A61C 8/0022 433/173 |

(Continued)

FOREIGN PATENT DOCUMENTS

FR 2690069 A1 * 10/1993 ............. A61C 8/005
KR 10-2008-0049378 6/2008
KR 10-0954931 4/2010

*Primary Examiner* — Sean M Michalski
*Assistant Examiner* — Shannel N Wright (57) ABSTRACT

Provided is a dental implant unit capable of reducing stress. The implant unit includes an fixture, which is assembled to an alveolar bone and includes a long hole therein; an intermediate structure inserted to the long hole of the fixture; and an abutment assembled to the intermediate structure, wherein the lower portion of the long hole of the fixture has a sloped surface, the lower portion of the intermediate structure also has a sloped surface, and at least a portion of the sloped surface of the long hole and at least a portion of the sloped surface of the intermediate structure contact each other.

3 Claims, 8 Drawing Sheets

(56) References Cited

U.S. PATENT DOCUMENTS

| | | | | |
|---|---|---|---|---|
| 5,695,335 A * | 12/1997 | Haas | ..................... | A61C 8/0048 433/169 |
| 5,752,830 A * | 5/1998 | Suarez | ................ | A61C 8/0086 433/169 |
| 5,782,918 A * | 7/1998 | Klardie | ................... | A61C 8/005 433/172 |
| 5,888,218 A * | 3/1999 | Folsom | ................ | A61C 8/0018 433/172 |
| 5,951,287 A * | 9/1999 | Hawkinson | ............ | A61C 8/005 433/141 |
| 6,102,702 A * | 8/2000 | Folsom, Jr. | ............ | A61C 8/005 433/172 |
| 6,155,828 A * | 12/2000 | Lazzara | ................ | A61C 8/008 433/172 |
| 8,408,905 B2 * | 4/2013 | Hayashi | ............... | A61C 8/0012 433/173 |
| 2003/0170588 A1* | 9/2003 | Augthun | .............. | A61C 8/0001 433/72 |
| 2003/0194679 A1* | 10/2003 | Odrich | ................... | A61C 8/005 433/173 |
| 2004/0101807 A1* | 5/2004 | Porter | ................... | A61C 8/0001 433/173 |
| 2006/0110706 A1* | 5/2006 | Jorneus | ................. | A61C 8/005 433/173 |
| 2006/0246397 A1* | 11/2006 | Wolf | ..................... | A61C 8/0006 433/173 |
| 2008/0241789 A1* | 10/2008 | Mundorf | .............. | A61C 8/0018 433/173 |
| 2009/0123889 A1* | 5/2009 | Mehrhof | .................. | A61C 8/00 433/173 |
| 2009/0136899 A1* | 5/2009 | Porter | .................. | A61C 8/0001 433/174 |
| 2010/0248181 A1* | 9/2010 | Kremer | ............... | A61B 17/888 433/152 |
| 2011/0123949 A1* | 5/2011 | Wolf | ...................... | A61C 8/005 433/173 |
| 2011/0151407 A1* | 6/2011 | Canullo | ................ | A61C 8/0022 433/174 |
| 2013/0004916 A1* | 1/2013 | Bellanca | ............. | A61C 8/0018 433/173 |
| 2013/0224689 A1* | 8/2013 | Ishiwata | .............. | A61C 8/0066 433/201.1 |
| 2013/0244207 A1* | 9/2013 | Cho | ..................... | A61C 8/0001 433/173 |
| 2015/0147724 A1* | 5/2015 | Staudenmann | ....... | A61C 8/0059 433/201.1 |
| 2015/0313690 A1* | 11/2015 | Elsner | ................. | A61C 8/0053 433/173 |

* cited by examiner

Fig. 8

IMPLANT UNIT

CROSS-REFERENCE TO RELATED APPLICATION

This application claims priority of Korean Patent Application No. 10-2015-0000784, filed on Jan. 5, 2015 and priority of Korean Patent Application No. 10-2015-0010147, filed on Jan. 21, 2015, in the KIPO (Korean Intellectual Property Office), the disclosure of which is incorporated herein entirely by reference.

BACKGROUND OF THE INVENTION

Field of the Invention

Embodiments of the present disclosure relate to an implant unit, and more particularly, to a dental implant unit capable of reducing stress.

Description of the Related Art

An artificial tooth is an artificially fabricated tooth that is almost identical a natural tooth of a man in terms of the appearance and functions. The artificial tooth is used to replace a natural tooth when the natural tooth is damaged or missing based on various causes, such as a cavity.

In case of replacing a natural tooth with the artificial tooth based on symptoms and prognosis of odontopathy, there are three common approaches including a bridge, a denture, and an implant into an alveolar bone. In case of the bridge, it is necessary to drill healthy adjacent teeth. As a result, natural teeth are damaged. Furthermore, masticating force is weakened due to lack of a dental root, and lifespan thereof is only about ten years. In case of the denture, natural teeth are damaged and the alveolar bone is gradually absorbed. Furthermore, the denture may be detached from the mouth of a user or may irritate the mount of the user.

Meanwhile, an implant surgery for implanting an artificial tooth to the alveolar bone does not damage adjacent natural teeth and may be independently implanted as long as the alveolar bone maintains a suitable condition for the implant surgery. Furthermore, after the implant surgery, the appearance and functions of the artificial tooth are excellent and hardly distinguishable from natural teeth. Therefore, implant surgeries are being widely performed. Furthermore, an implant unit used for the implant surgeries may be permanently used with proper cares.

A conventional implant unit for implanting an artificial tooth to the alveolar bone generally includes a crown that functions as a tooth, a fixture functions as a dental root, and an abutment interconnecting the crown and the fixture. In case of the implant unit, when weights are continuously applied in the mouth as a user masticates the food, the alveolar bone may be damaged or the alveolar bone may be absorbed due to continuous stress concentration, thereby causing additional odontopathy or reducing lifespan of the implant unit. Furthermore, if the alveolar bone is already significantly absorbed, it is difficult or impossible to apply a conventional implant unit without performing an additional bone grafting surgery, e.g., a case where a distance to a paranasal sinus (maxillary sinus) at the maxillary molar is insufficient or a case where a distance to a nerve at the mandible molar is insufficient.

SUMMARY OF THE INVENTION

Embodiments of the present invention include an implant unit that is capable of reducing and eliminating possible continuous stress to the implant unit for permanent use of the implant unit and prevention of additional odontopathy due to the implant unit and may be immediately implanted to a patient without an additional bone grafting surgery even if a relatively large portion of the alveolar bone of the patient is absorbed.

According to an aspect of the inventive concept, there is provided an implant unit including an fixture, which is assembled to an alveolar bone and includes a long hole therein; an intermediate structure inserted to the long hole of the fixture; and an abutment assembled to the intermediate structure, wherein the lower portion of the long hole of the fixture has a sloped surface, the lower portion of the intermediate structure also has a sloped surface, and at least a portion of the sloped surface of the long hole and at least a portion of the sloped surface of the intermediate structure contact each other.

The sloped surface of the long hole and the sloped surface of the intermediate structure may have same cross-sections and fully surface-contact each other. A notched portion is formed on the inner sidewall of the long hole of the fixture, a notched portion is formed on the sidewall of the intermediate structure, and the fixture and the intermediate structure may be coupled with each other as an assembly ring is inserted between the notched portion of the fixture and the notched portion of the intermediate structure.

A stepped portion may be provided on the inner sidewall of the long hole of the fixture, and a counter-stepped portion corresponding to the stepped portion may be provided on the sidewall of the intermediate structure. At least one or more gaps may be formed between the long hole of the fixture and the intermediate structure. The at least one or more gaps may include a first gap between the upper portion of the long hole of the fixture and the intermediate structure; a second gap between the stepped portion of the fixture and the counter-stepped portion of the intermediate structure; and a third gap between the lower-end portion of the intermediate structure and the lower-end portion of the long hole of the fixture. Furthermore, the at least one or more gaps are filled with at least one of a biocompatible material, a lubricating material, and an elastic polymer. A groove pattern is formed on the outer surface of the intermediate structure.

The fixture may include a stress-reducing gap that is defined by a trench formed in the depth-wise direction at a portion of the top surface of the fixture. The stress-reducing gap may be empty or filled with a biocompatible material.

According to another aspect of the inventive concept, there is provided an implant unit including an fixture, which is assembled to an alveolar bone and includes a long hole therein; an intermediate structure inserted to the long hole of the fixture; and an abutment assembled to the intermediate structure, wherein the fixture and the intermediate structure are coupled with each other by a first structure formed on the intermediate structure and a second structure formed on the fixture that accommodates the first structure. According to some embodiments, the first structure may include a bump or a groove formed at the lower-end portion of the intermediate structure, and the second structure for accommodating the bump or the groove may be formed on the inner sidewall of the fixture. Alternatively, the fixture may include the bump formed along the inner circumferential surface of the fixture, and the intermediate structure may include the groove for accommodating the bump. The lower portion of the intermediate structure may be a basin structure formed as a plurality of basins are formed apart from one another.

The implant unit may further include an assembling element that is screw-assembled to the intermediate structure and the inner sidewall of the abutment. The assembling element may be a shortened assembling element having a relatively small length or an elongated assembling element having a relatively large length. A bump for coupling the assembling element may be formed along the inner circumferential surface of the intermediate structure, and a groove for accommodating the bump may be formed at the assembling element. A gap may be formed between the lower-end portion of the intermediate structure and the lower-end portion of the long hole.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

It will be understood that when a layer is referred to as being "formed on," another layer, it can be directly formed on the other layer or intervening layers may be present therebetween. Likewise, when a material is referred to as being adjacent to another material, intervening materials may be present therebetween. In contrast, when a layer or material is referred to as being "directly" formed on, to another layer or material or as being "directly" adjacent to or contacting another layer or material, there are no intervening materials or layers therebetween.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1A:
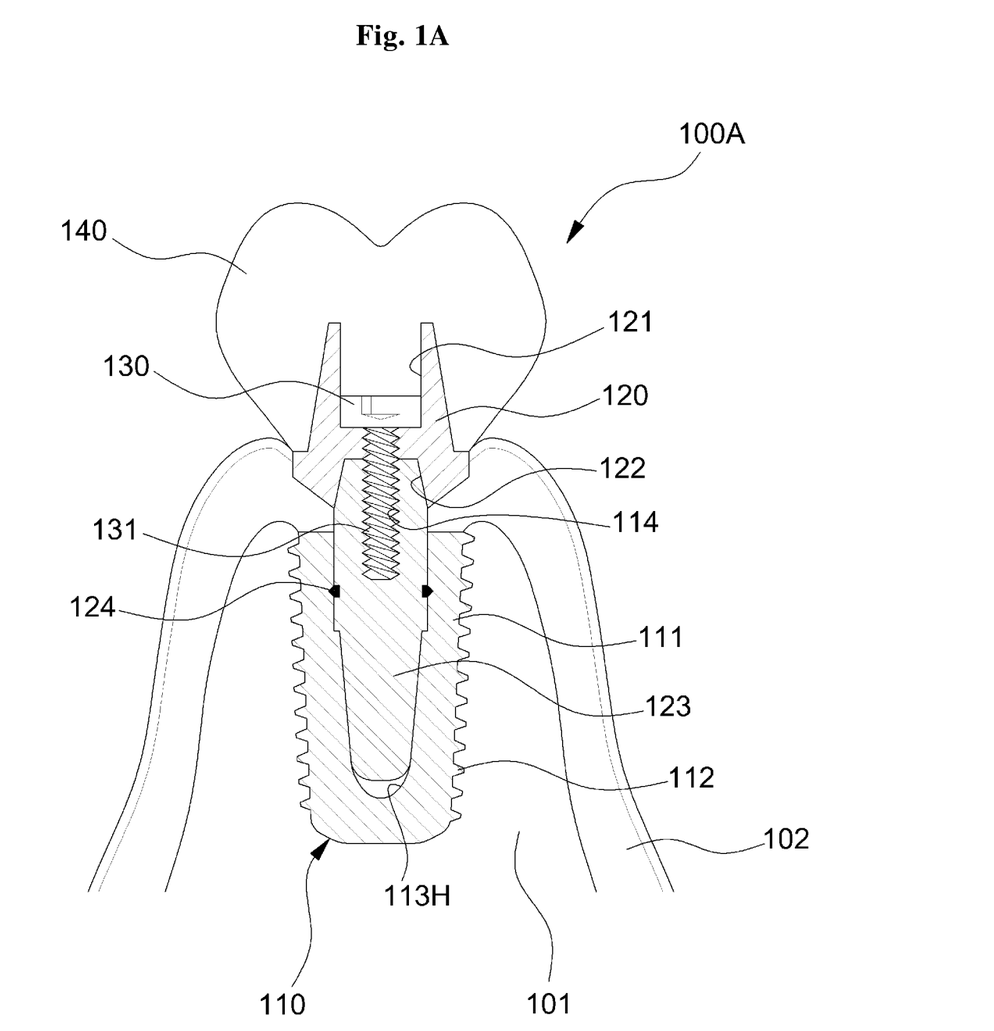
FIG. 1A is a sectional diagram showing an implant unit according to an embodiment of the present disclosure.
Figure 1B:
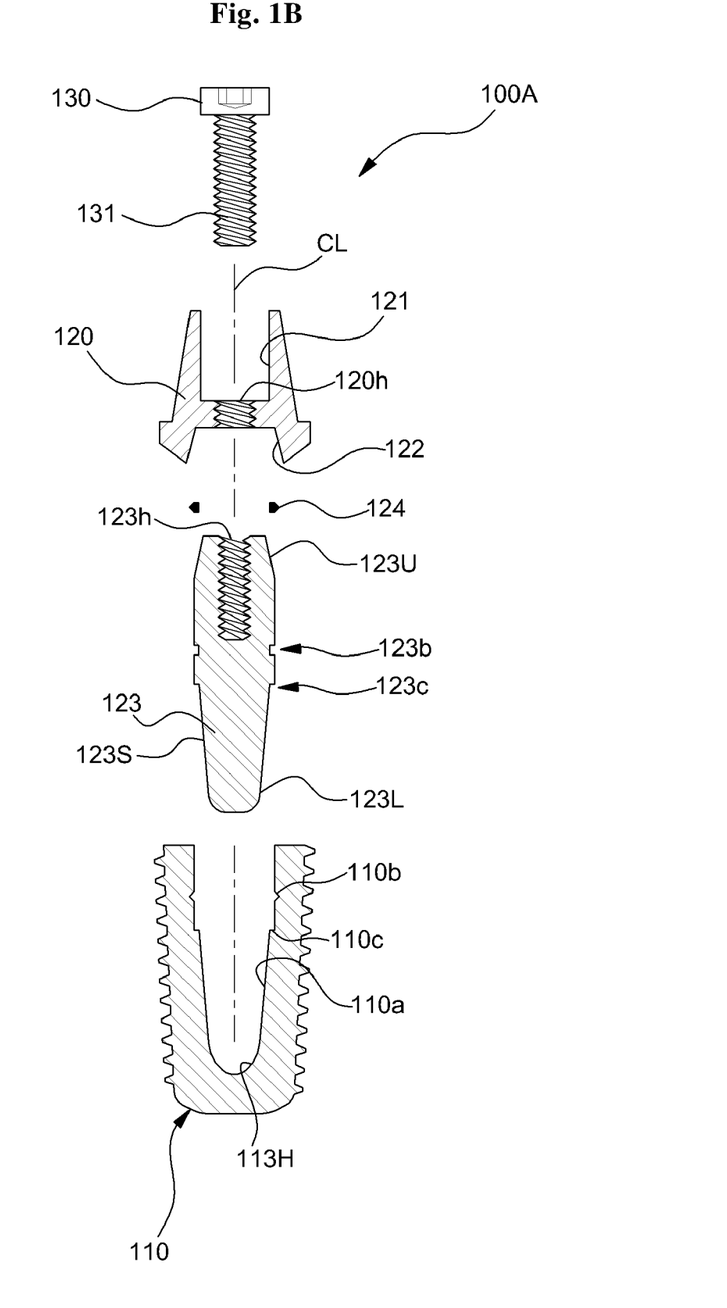
FIG. 1B is a diagram showing how an intermediate structure and an abutment are assembled to a fixture.
Figure 1C:
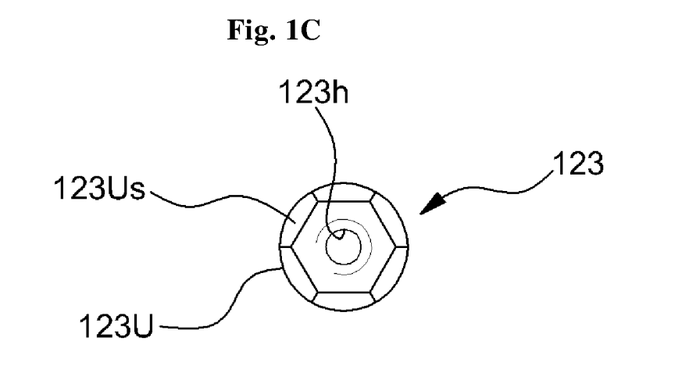
FIG. 1C is a plan view of an upper-end portion of the intermediate structure.

FIG. 1A is a sectional diagram showing an implant unit 100 according to an embodiment of the present disclosure, FIG. 1B is a diagram showing how an intermediate structure 123 and an abutment 120 are assembled to a fixture 110, and FIG. 1C is a plan view of an upper-end portion 123U of the intermediate structure 123.

Referring to FIGS. 1A and 1B, the implant unit 100 according to an embodiment of the present disclosure includes the fixture 110 implanted to an alveolar bone 101, the intermediate structure 123 inserted to and fixed in the fixture 110, the abutment 120 mounted on the top of the intermediate structure 123, and an assembling element 130 that assembles the intermediate structure 123 to the abutment 120. An artificial tooth or crown 140 may be assembled to the top of the abutment 120.

The fixture 110 is directly implanted to the alveolar bone 101 covered by a gum 102 and functions as a pillar. According to an embodiment of the present disclosure, the maximum diameter or width of the fixture 110 is within a range from 1 mm to 6 mm and may be within a range from 1 mm to 3 mm. An outer body 111 of the fixture 110 may be implanted to and integrated with the alveolar bone 101. Although the outer body 111 shown in FIG. 1 has a tapered shape, it is merely an example, and the present disclosure is not limited thereto. For example, the outer body 111 may have a pillar-like shape having a constant width or may have a partial tapered shape and a partial pillar shape. According to some embodiments, a thread may be provided on the outer surface of the outer body 111. FIG. 1A shows a thread having a bumpy pattern like a screw thread 112. In this case, the fixture 110 may be implanted and screw-fixed to the alveolar bone 101.

The fixture 110 may contain titanium, tungsten, aluminium, hafnium, niobium, tantalum, zirconium, platinum, or an alloy containing any one of the above-stated metals. However, the above-stated metals are merely examples, and the present disclosure is not limited thereto. Any of other non-corrosive metals with suitable strength and biocompatibility, non-metal ceramic artificial bone materials, or composite combinations thereof may be applied to the fixture 110.

According to some embodiments, the fixture 110 may include a calcium phosphate-based ceramic coating layer, such as hydroxyapatite ($Ca_{10}(PO_4)_6(OH)_2$, HA), having excellent bioactivity on the surface of the fixture 110 to improve adhesion by promoting reactivity against the alveolar bone 101. According to another embodiment, a metal ceramic, such as $TiO_2$, $Ta_2O_5$, $Nb_2O_5$, $ZrO_2$, $SiO_2$, $RuO_2$, $MoO_2$, $MoO_3$, VO, $VO_2$, $V_2O_3$, $V_2O_5$, $CrO_2$, or $CrO_3$, may be coated on the fixture 110. The above-stated metals are merely examples, and one of ordinary skill in the art will understand that an arbitrary material capable of promoting osseointegration may be used as the coating material.

A long hole 113H is formed in the fixture 110 along the central axis. The intermediate structure 123 is inserted to the long hole 113H. A hemispherical concave surface may be formed at the bottom surface of the long hole 113H as shown in FIG. 1A. However, it is merely an example, and the bottom surface of the long hole 113H may be flat. As shown in FIG. 1B, at least the lower portion of the long hole 113H may have a tapered shape. As shown in FIG. 1B, the sloped surface 110a may have a straight linear cross-section or an arched cross-section having a variable curvature. However, the present disclosure is not limited thereto. The vertical height of the sloped surface 110a may be within a range from 30% to 70% of a sum of the height of the fixture 110 and the height of the intermediate structure 123 assembled to the fixture 110. Stress is mainly concentrated within the range, and the sloped surface 110a disperses and absorbs the stress.

The long hole 113H may have a notched portion 110b at the lateral portion extending from the sloped surface 110a. The notched portion 110b is a portion for accommodating a coupling ring 124 and restricting movement of the coupling ring 124. According to some embodiments, a stepped portion 110c may be further provided at the lateral portion. The stepped portion 110c disperses vertical stress, which is transmitted from the intermediate structure 123 inserted to the long hole 113H, in a horizontal direction. The shape of the stepped portion 110c is not limited to a direction extending in horizontal directions and may be any shape having a gentler slope than the slope of the sloped surface 110a to form a step.

The lateral surface of the intermediate structure 123 inserted and fixed in the long hole 113H has a downward sloped surface 123S having a slope equal to or greater than that of the sloped surface 110a. At least a portion of the sloped surface 110a of the long hole 113H and at least a portion of the sloped surface 123S of the intermediate structure 123 may surface-contact each other. Each of the sloped surface 110a of the long hole 113H and the sloped surface 123S of the intermediate structure 123 may have a straight linear cross-section or an arched cross-section having a variable curvature. However, the present disclosure is not limited thereto. Preferably, the sloped surface 110a of the long hole 113H and the sloped surface 123S of the intermediate structure 123 may have same cross-sections and fully surface-contact each other. As a result, vertical stress applied from the crown 140 at the top of the implant unit 100A toward the fixture 110 at the bottom of the implant unit 100A along the central axis CL is uniformly dispersed to the fixture 110 by the tapered sloped surface 123S. As a result, the alveolar bone 101 may be protected, thereby increasing lifespan of the implant unit 100A. Furthermore, such the sloped surface 123S may function as a limiter for restricting the intermediate structure 123 from vertically moving downward in the long hole 113H.

Similar to the long hole 113H, a notched portion 123b that restricts movement of the coupling ring 124 as a portion of the coupling ring 124 is inserted thereto is formed on the sidewall of the intermediate structure 123. The intermediate structure 123 inserted to the long hole 113H may be coupled with the long hole 113H via a certain coupling element. FIG. 1B exemplifies the coupling ring 124 as the coupling element. The coupling ring 124 may be formed of a metal. For example, the coupling ring 124 may include a shape-memory alloy or a highly elastic metal.

According to another embodiment, the coupling element may be a friction clip. The notched portion 110b of the long hole 113H and the notched portion 123b of the intermediate structure 123 may be ring-like groove patterns perpendicular to the vertical axes CL of the long hole 113H and the intermediate structure 123. When the coupling ring 124 is inserted to the notched portion 123b of the intermediate structure 123, the coupling ring 124 is coupled with the intermediate structure 123. If the coupling ring 124 is formed of a highly elastic metal, the coupling ring 124 may be press-assembled to the intermediate structure 123. In this case, a portion of the coupling ring 124 may protrude from the sidewall of the intermediate structure 123. When the intermediate structure 123 coupled with the coupling ring 124 is inserted to the long hole 113H, the coupling ring 124 is inserted to the notched portion 110b of the long hole 113H, thereby forming a coupling between the intermediate structure 123 and the fixture 110.

According to some embodiments, if the stepped portion 110c is provided in the long hole 113H of the fixture 110, a counter-stepped portion 123c is also provided on the sidewall of the intermediate structure 123 as a component corresponding to the long hole 113H of the fixture 110. The stepped portion 110c and the counter-stepped portion 123c may be designed to form a distance of about 0.5 mm between the intermediate structure 123 and the long hole 113H when the intermediate structure 123 is normally inserted to the long hole 113H. Therefore, the stepped portion 110c and the counter-stepped portion 123c may cause the fixture 110 to closely contact the intermediate structure 123. The maximum diameter or width of the fixture 110 may be within a range from 3 mm to about 6 mm. The length of the fixture 110 may be within a range from 3 mm to about 15 mm.

The abutment 120 is assembled to the upper-end portion 123U of the intermediate structure 123. To this end, the upper-end portion 123U of the intermediate structure 123 may protrude more than the fixture 110, thereby securing an area for mounting the abutment 120. To prevent the abutment 120 mounted on the upper-end portion 123U of the intermediate structure 123 from being rotated and slipped, the upper-end portion 123U of the intermediate structure 123 may secure an area for mounting the abutment 120. The upper-end portion 123U of the intermediate structure 123 is not limited to a tapered cone-like structure having a circular cross-section and may include a polypyramid-like structure having a polygonal cross-section (e.g., a rectangular cross-section, a pentagonal cross-section, a hexagonal cross-section, etc.) or an elliptical cone-like structure having an elliptical cross-section. FIG. 1C exemplifies a tapered polypyramid-like structure having a hexagonal cross-section. The abutment 120 mounted on the upper-end portion 123U of the intermediate structure 123 may also have a bumpy area having a corresponding shape for accommodating such a polypyramid-like structure or an elliptical cone-like structure.

The abutment 120 functions as a supporter for mounting an artificial tooth or the crown 140. According to an embodiment, bumpy pattern may be provided on the upper portion 121 and/or the lower portion 122 of the abutment 120. The bumpy pattern of the upper portion 121 may improve adhesion of an artificial tooth or the crown 140 assembled thereto. The bumpy pattern of the lower portion 122 may prevent a relative rotation of the abutment 120 when the abutment 120 is assembled to the intermediate structure 123, thereby forming a stable assembly. The lower portion 122 of the abutment 120 may include the bumpy pattern for accommodating the upper-end portion 123U of the intermediate structure 123. If the upper-end portion 123U of the intermediate structure 123 is a tapered portion of which the width decreases upward, the contact area between the lower portion 122 of the abutment 120 and the upper-end portion 123U of the intermediate structure 123 may be increased by the tapered portion, thereby dispersing stress formed between the lower portion 122 of the abutment 120 and the intermediate structure 123. Therefore, according to an embodiment of the present disclosure, lifespan of the implant unit 100 may be increased and the lower portion 122 of the abutment 120 may be easily assembled to the intermediate structure 123 during an implant operation as the sloped surface functions as a guide.

The abutment 120 may be formed of any one selected from among titanium (Ti), a surgical stainless steel, gold (Au), a white ceramic zirconium (Zr), and equivalents thereof. However, materials constituting the abutment 120 are not limited thereto. For example, the abutment 120 may be fully or partially formed of a shape-memory alloy.

An artificial tooth or the crown 140 is mounted on the abutment 120 mounted on the upper-end portion 123U of the intermediate structure 123. The abutment 120 and the intermediate structure 123 may be firmly coupled with each other via a screw 130. An assembling groove 123h is formed on the inner wall of the intermediate structure 123, and the screw 130 may be assembled to the intermediate structure 123 via a screw thread formed in the assembling groove 123h. A structure for coupling the abutment 120 with the upper-end portion 123U of the intermediate structure 123 is not limited to screw coupling, and another coupling structure may replace the screw coupling or may be applied together with the screw coupling. The assembling element 130 may be formed of a metal, such as titanium (Ti) or a surgical stainless steel, or an alloy thereof for improving mechanical strength of the fixture 110 with relatively weak mechanical strength.

According to the above embodiment, the intermediate structure 123 enables the fixture 110 to function immediately as the fixture 110 is implanted. Furthermore, the intermediate structure 123 may protect an implant unit and an alveolar bone from harmful shocks from mastication of the food, teeth clenching, and teeth grinding.

Furthermore, even if a normal-length implant unit cannot be implanted due to an insufficient distance to a paranasal sinus (maxillary sinus) at the maxillary molar an insufficient distance to a nerve at the mandible molar caused by excessive absorption of an alveolar bone 101, the implant unit 100A that may function normally via stress dispersion may be implanted without an additional bone grafting surgery. If a normal-length implant unit can be implanted, the implant unit 100A may function immediately after the implant operation.

As the width of the fixture 110 is reduced, an additional surgery, such as a bone grafting surgery for implanting the fixture 110, may be omitted, and thus the fixture 110 may be quickly implanted. As a result, pain and recovery period after a surgery and surgery cost may be reduced. Particularly, in case of a patient with the thin alveolar bone 101 due to absorption of the alveolar bone 101 or teeth with a relatively small distance therebetween, the fixture 110 having a small diameter may be applied. Therefore, according to an embodiment of the present disclosure, in case of applying the fixture 110 having a small diameter from about 1 mm to about 3 mm, absorption and dispersion of stress equal to those expectable from an implant unit having a relatively large size may be expected due to a stress-reducing gap 115. Furthermore, as described above, the implant unit 100A may absorb and disperse stress, thereby improving surgery prognosis. Furthermore, the implant unit 100A may prevent absorption of the alveolar bone 101 by reducing stress at a tooth neck (where the implant unit 100A meets the gum 102), thereby increasing lifespan of the implant unit 100A.

Figure 2:
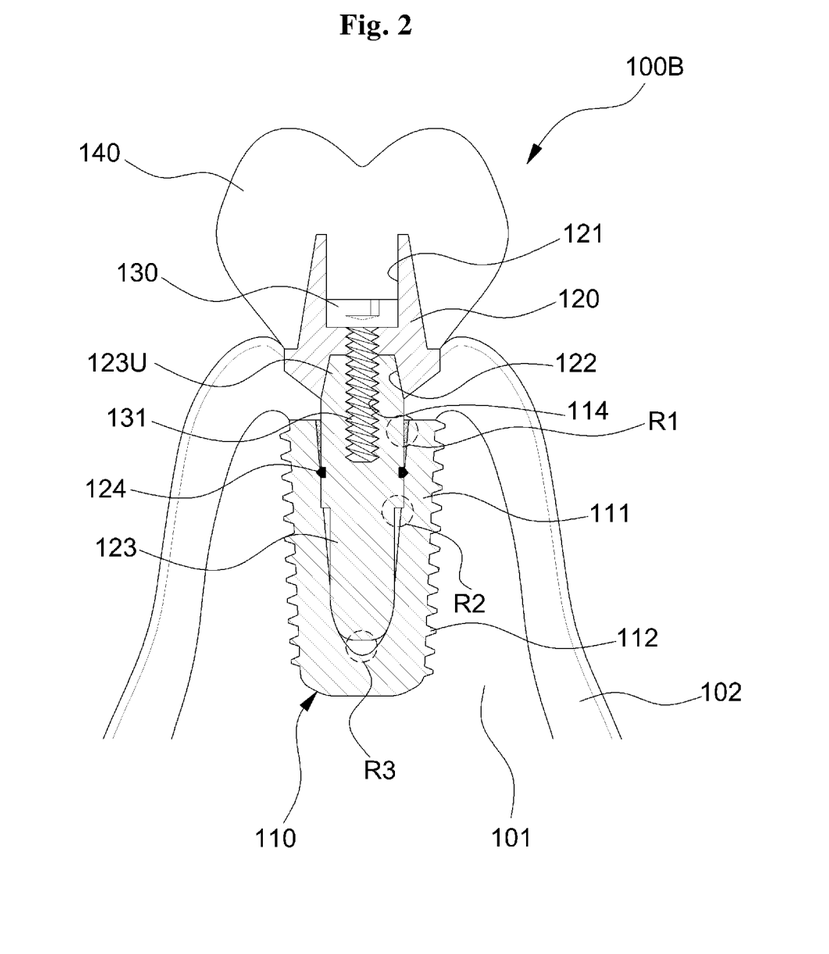
FIG. 2 is a sectional view of an implant unit according to another embodiment of the present disclosure.

FIG. 2 is a sectional view of an implant unit 100B according to another embodiment of the present disclosure. From among the components thereof, descriptions given above may be applied to components denoted by reference numerals same as those denoting the above-stated components unless being contradictory.

Referring to FIG. 2, the implant unit 100B may include a fixture 110 implanted to the alveolar bone 101, an abutment 120 mounted on an upper-end portion 123U of an intermediate structure 123, and an assembling element 130 that assembles the abutment 120 to the intermediate structure 123. If the alveolar bone 101 of a patient is relatively weak, the implant unit 100B may include at least one or more gaps R1, R2, and R3 between the intermediate structure 123 and a long hole 113H of the fixture 110 to loosen the assembly between the intermediate structure 123 and the fixture 110.

According to some embodiments, the gaps R1, R2, and R3 may be filled with a lubricating material for easy assembly of the intermediate structure 123 to the fixture 110 from among biocompatible materials. According to some embodiments, the first gap R1 between the upper portion of the long hole 113H of the fixture 110 and the intermediate structure 123 may be filled with a soft tapered ring or clip or an elastic material. The second gap R2 and the third gap R3 may remain as empty spaces.

According to an embodiment, an elastic biocompatible polymer may fill one or more of the gaps R1, R2, and R3. The elastic biocompatible polymer may be a synthetic polymer, such as polyvinylpyrrolidone (PVP), polyethylene glycol (PEG), or poly-carprolactone, or a natural polymer, such as gelatin, chitosan, hyaluronic acid, or alginic acid. However, the above-stated materials are merely examples, and the present disclosure is not limited thereto, where any one of the other biocompatible resins known in the art may be applied thereto.

To fill the second gap R2 formed nearby the assembly between an stepped portion 110c of the long hole 113H of the fixture 110 and an counter-stepped portion 123c of the intermediate structure 123 and the third gap R3 formed between the lower-end portion 123L of the intermediate structure 123 and the bottom of the long hole 113H of the fixture 110 with the elastic polymer or the lubricant described above, a groove pattern for allowing flow of the elastic polymer fluid or the lubricant fluid may be formed on a surface of the intermediate structure 123.

Due to the gaps R1, R2, and R3, the implant unit 100B may function immediately as the implant unit 100B is implanted. Furthermore, the intermediate structure 123 may protect an implant unit and an alveolar bone from harmful shocks from mastication of the food, teeth clenching, and teeth grinding.

Figure 3A:
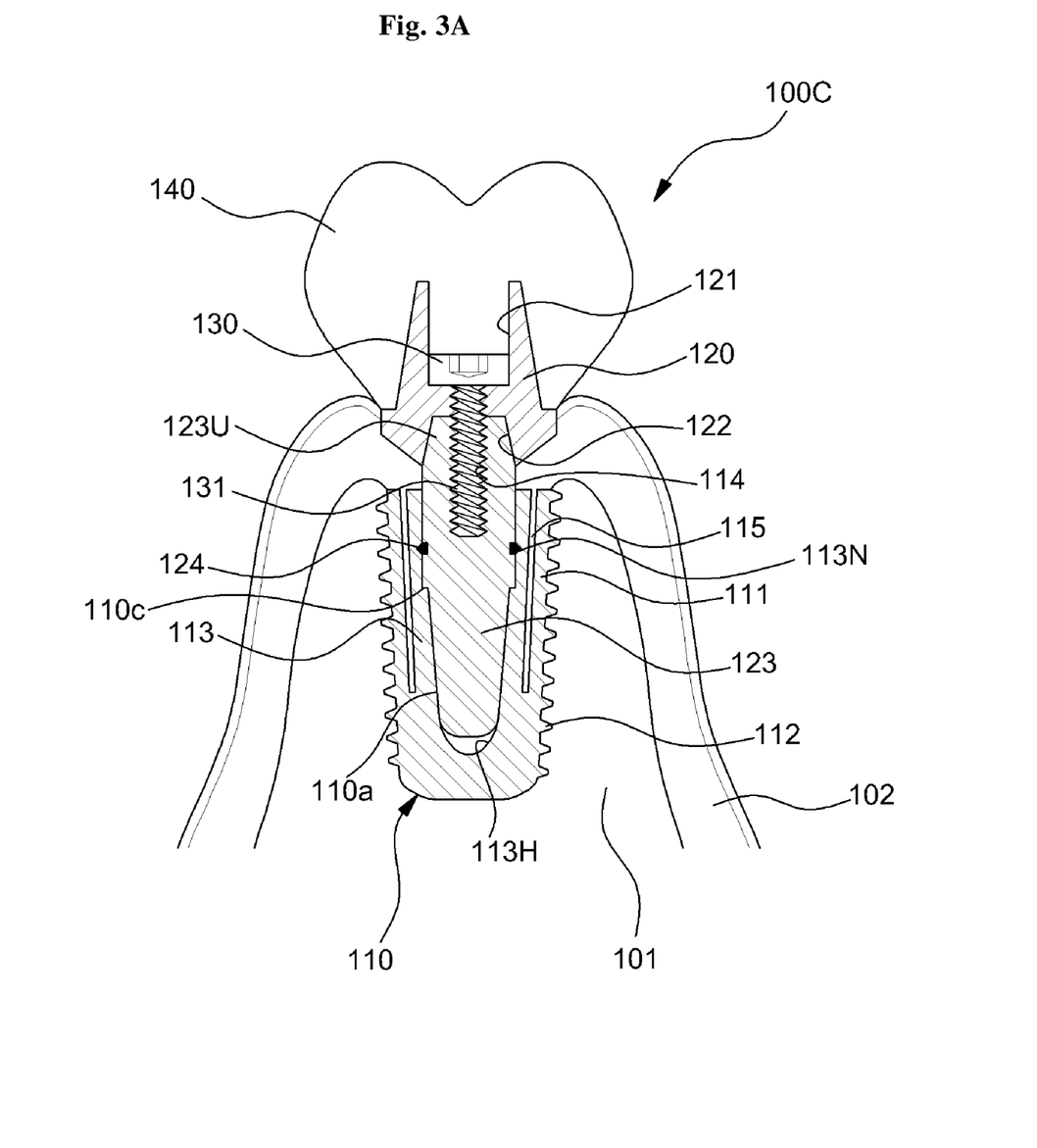
FIGS. 3A and 3B are sectional views of an implant unit according to another embodiment of the present disclosure.
Figure 3B:
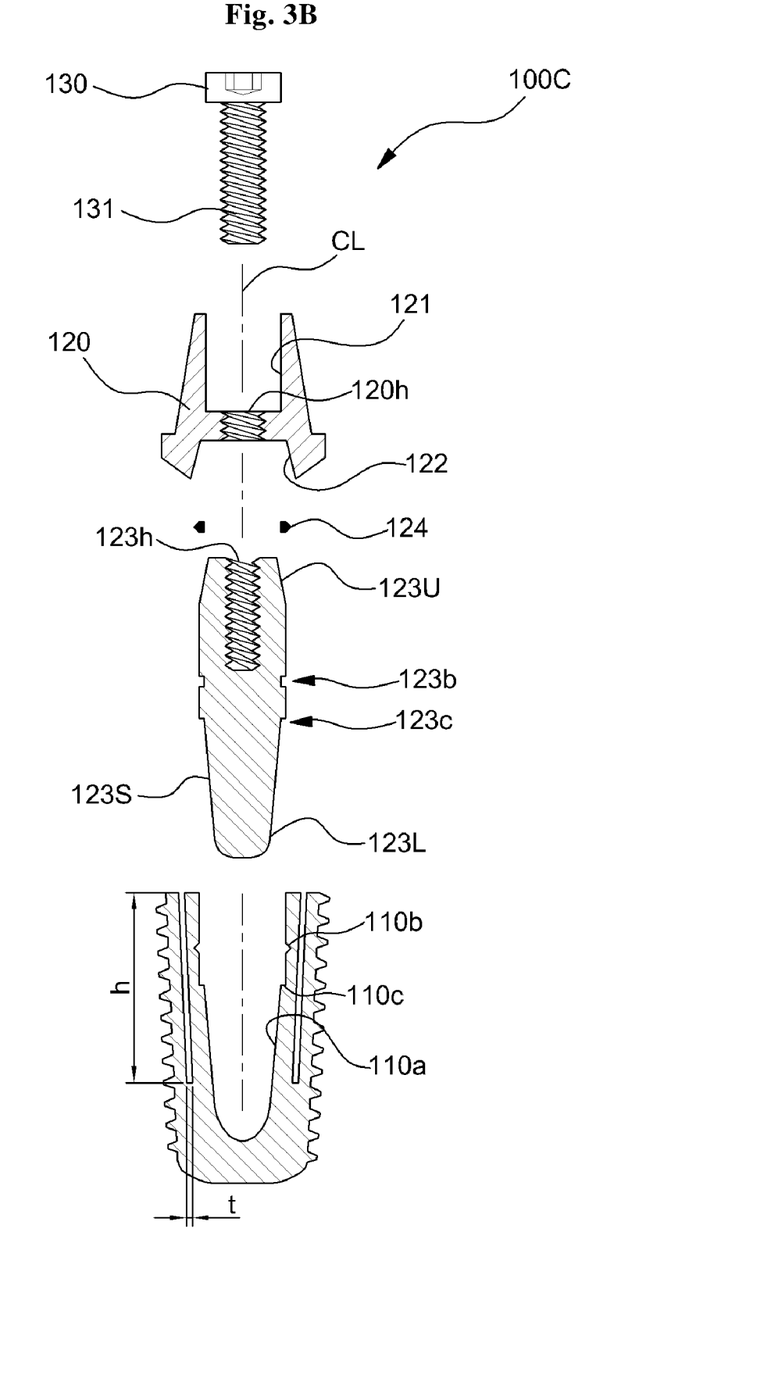

FIGS. 3A and 3B are sectional views of an implant unit 100C according to another embodiment of the present disclosure. From among the components thereof, descriptions given above may be applied to components denoted by reference numerals same as those denoting the above-stated components unless being contradictory.

Referring to FIGS. 3A and 3B, the implant unit 100C may include a fixture 110 implanted to the alveolar bone 101, an abutment 120 mounted on an upper-end portion 123U of an intermediate structure 123, and an assembling element 130 that assembles the abutment 120 to the intermediate structure 123. The fixture 110 includes an outer body 111, an inner body 113, and a stress-reducing gap 115 between the outer body 111 and the inner body 113. Although the outer body 111 and the inner body 113 are integrated with each other, it is merely an example, and the outer body 111 and the inner body 113 may be separate components.

A long hole 113H may be formed in the inner body 113 in the depth-wise direction along the central axis (refer to CL of FIG. 3B). The intermediate structure 123 is inserted to the long hole 113H. As shown in FIG. 3A, at least the lower portion of the long hole 113H may have a tapered shape, whereas the intermediate structure 123 may also have a tapered shape in correspondence to the tapered shape of the long hole 113H. Therefore, vertical stress applied by the crown 140 at the top of the implant unit 100C toward the fixture 110 via the central axis CL is uniformly dispersed to the fixture 110 by a sloped surface 110a. Therefore, the alveolar bone 101 may be protected, and thus lifespan of the implant unit 100C may be increased. Furthermore, such the sloped surface 110a may function as a limiter for restricting the intermediate structure 123 from vertically moving downward in the long hole 113H.

The intermediate structure 123 inserted to the long hole 113H may be coupled with the long hole 113H via a certain coupling element. FIGS. 3A and 3B exemplify the coupling ring 124 as the coupling element. The coupling ring 124 may be formed of a metal. For example, the coupling ring 124 may include a shape-memory alloy or a highly elastic metal. According to another embodiment, the coupling element may be a friction clip. Furthermore, instead of the assembling element, bumpy patterns that are formed to be coupled with each other may be formed at the intermediate structure 123 and the inner body 113, respectively.

The fixture 110 includes the stress-reducing gap 115, which is defined by a trench formed in the depth-wise direction at a portion of the top surface of the fixture 110. The fixture 110 includes the outer body 111, which is exposed toward the gum 102, and the inner body 113, which is close to the central axis (CL of FIG. 3B) of the fixture 110, around the stress-reducing gap 115. The stress-reducing gap 115 between the outer body 111 and the inner body 113 may be formed to be a certain distance apart from the central axis CL and to have a certain depth in a direction from the upper-end portion of the fixture 110 toward the lower-end portion of the fixture 110, such that the outer body 111 may have a sufficient thickness. The stress-reducing gap 115 may be formed along the central axis CL of the fixture 110 as a trench having a certain height h and a certain width t.

According to an embodiment, the outer body 111 and the inner body 113 are formed in a machining operation for forming the stress-reducing gap 115 in a single body. In this case, the outer body 111 and the inner body 113 constitute a single body. FIG. 3A exemplifies that the outer body 111 and the inner body 113 constitute a single body. However, it is merely an example. The outer body 111 and the inner body 113 may be separate components or the outer body 111 and the inner body 113 may be screw-assembled to each other.

The outer body 111 of the fixture 110 may be implanted to and integrated with the alveolar bone 101. Although the outer body 111 shown in FIG. 3A has a tapered shape, it is merely an example, and the present disclosure is not limited thereto. For example, the outer body 111 may have a pillar-like shape having a constant width or may have a partial tapered shape and a partial pillar shape. According to some embodiments, a thread may be provided on the outer surface of the outer body 111. FIG. 3A shows a thread having a bumpy pattern like a screw thread 112. In this case, the fixture 110 may be implanted and screw-fixed to the alveolar bone 101.

The stress-reducing gap 115 may be an empty gap as shown in FIG. 3A or may be filled with a biocompatible material. The stress-reducing gap 115 guarantees elastic behaviors of the outer body 111 with respect to the outer body 111 of the fixture 110 due to stress transmitted via the crown 140. Therefore, concentration of stress directly applied to the fixture 110 or applied to the interface between the fixture 110 and the outer body 111 may be reduced or suppressed. For example, while a user is masticating the food, a weight applied to the crown 140 may be transmitted to the fixture 110 via the abutment 120. In this case, due the stress-reducing gap 115, the inner body 113 of the implant unit 100 fixed to the outer body 111 swings around the central axis CL, and thus the weight may be absorbed and dispersed.

The stress-reducing gap 115 may have a ring-like cross-sectional pattern perpendicular to the central axis CL and surrounding the central axis CL. The ring-like cross-sectional pattern may have a trench-like shape having ring-like cross-sections perpendicular to the central axis for absorption of stress applied in random direction. However, the present disclosure is not limited to the ring-like cross-sectional pattern.

For example, according to another embodiment, the stress-reducing gap 115 may have an elliptical cross-sectional pattern or a circular arc-like cross-sectional pattern or an elliptical arc cross-sectional pattern having a certain length that is perpendicular to the central axis CL and surrounds the central axis CL for absorption of stress and/or guidance of elastic behaviors. Furthermore, the stress-reducing gap 115 may be formed only at a portion that needs stress absorption and dispersion. To this end, the stress-reducing gap 115 may be formed to have a shape like an arc of ½ the circumference, ⅓ the circumference, or ¼ the circumference instead of a ring-like shape. Furthermore, the partial arc-like shape may be symmetrical or asymmetrical.

The depth h of the stress-reducing gap 115 is smaller than the overall height of the outer body 111 and may be within a range from 5% to 95% of the length of the fixture 110. However, the present disclosure is not limited thereto. As the depth h of the stress-reducing gap 115 is reduced, relative displacement between the inner body 113 and the outer body 111 becomes difficult. As a result, effects for absorbing and dispersing stress are deteriorated. However, if the depth h of the stress-reducing gap 115 becomes excessive, sufficient elastic recovery cannot be secured, e.g., the outer body 111 of the fixture 110 may be curved toward the inner body 113 or mechanical strength of the inner body 113 may be weakened. Therefore, depth h of the stress-reducing gap 115 may be limited to one of certain depths according to materials. FIG. 3A exemplifies that the depth h of the stress-reducing gap 115 is about 50% of the length of the fixture 110.

According to an embodiment of the present disclosure, the maximum diameter or width of the fixture 110 is within a range from 1 mm to 6 mm and may be within a range from 1 mm to 3 mm. The width t of the stress-reducing gap 115 may be within a range from 0.1 mm to 1.5 mm and may be within a range from 0.1 mm to 1 mm. The length of the fixture 110 may be within a range from 3 mm to 15 mm. However, the above-stated numerical ranges are merely examples, and the present disclosure is not limited thereto.

As the width of the fixture 110 is reduced, an additional surgery, such as a bone grafting surgery for implanting the fixture 110, may be omitted, and thus the fixture 110 may be quickly implanted. As a result, pain and recovery period after a surgery and surgery cost may be reduced. Particularly, in case of a patient with the thin alveolar bone 101 due to absorption or teeth with a relatively small distance therebetween, the fixture 110 having a small diameter may be applied. Therefore, according to an embodiment of the present disclosure, in case of applying the fixture 110 having a small diameter from about 1 mm to about 3 mm, absorption and dispersion of stress equal to those expectable from an implant unit having a relatively large size may be expected due to a stress-reducing gap 115. Furthermore, as described above, the implant unit 100C may absorb and disperse stress, thereby improving surgery prognosis. Furthermore, the implant unit 100C may prevent absorption of the alveolar bone 101 by reducing stress at a tooth neck (where the implant unit 100A meets the gum 102), thereby increasing lifespan of the implant unit 100A.

Figure 4:
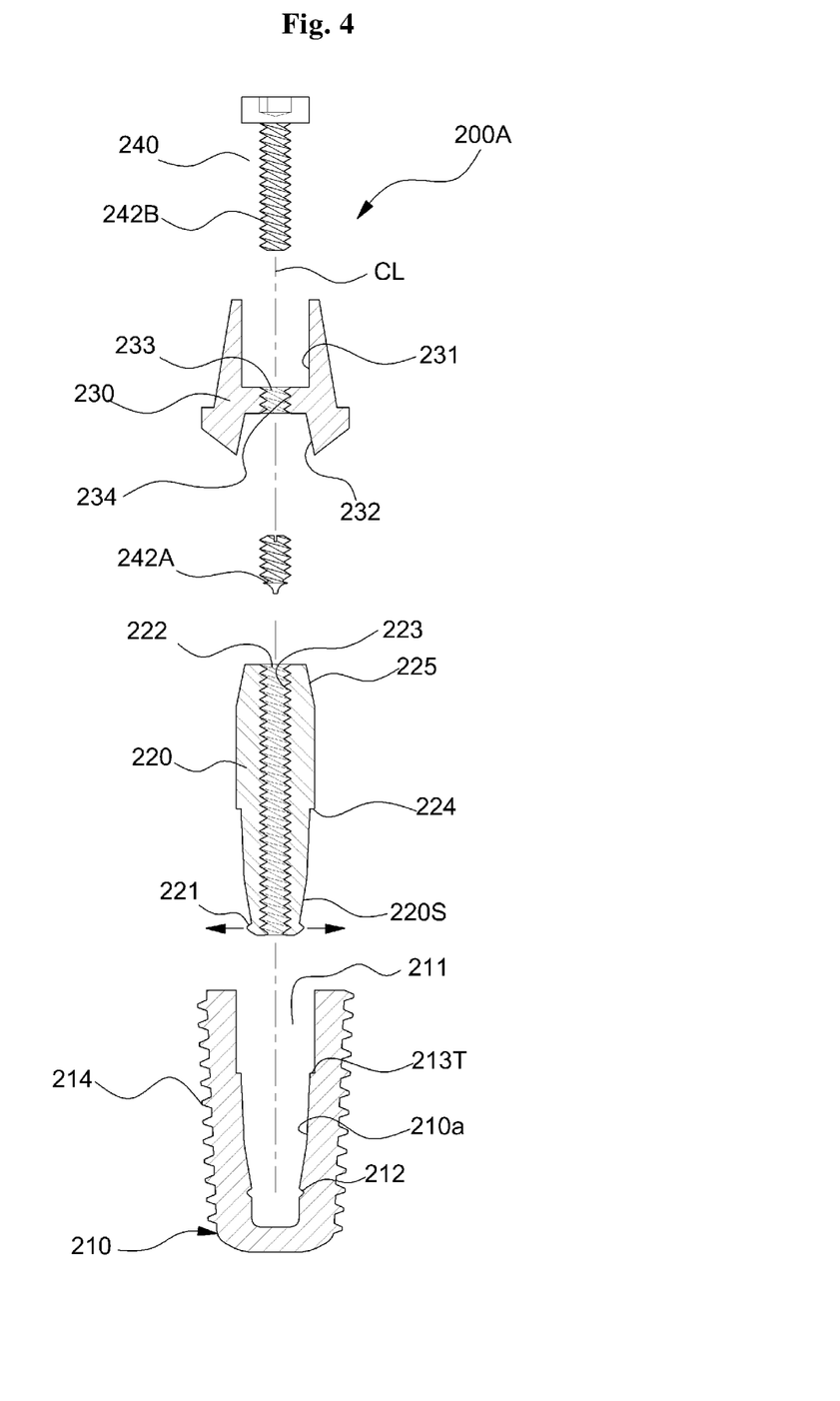
FIG. 4 is an exploded sectional view of an implant unit according to another embodiment of the present disclosure.
Figure 5:
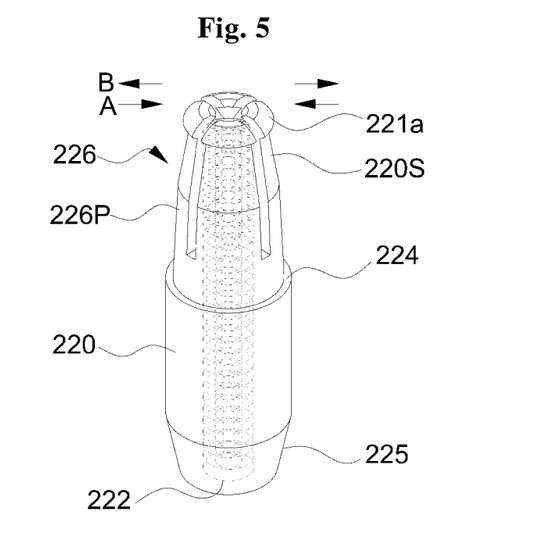
FIG. 5 is a perspective view of an intermediate structure according to an embodiment of the present disclosure.

FIG. 4 is an exploded sectional view of an implant unit 200A according to another embodiment of the present disclosure, and FIG. 5 is a perspective view of an intermediate structure 220 according to an embodiment of the present disclosure.

Referring to FIG. 4, the implant unit 200A according to an embodiment includes a fixture 210, which is assembled to an alveolar bone and includes a long hole 211 formed therein, the intermediate structure 220 inserted to the long hole 211 of the fixture 210, and an abutment 230 assembled to the intermediate structure 220.

The fixture 210 is directly implanted to the alveolar bone (jaw bone) formed below the gum and functions as a pillar. To this end, a plurality of screw threads or a bumpy pattern may be formed on the outer surface of the fixture 210 to be assembled to the alveolar bone. FIG. 4 exemplifies screw threads. The fixture 210 may contain titanium (Ti), tungsten (W), aluminium (Al), hafnium (He), niobium (Nb), tantalum (Ta), zirconium (Zr), platinum (Pt), or an alloy of any one of the metals. However, the above-stated metals are merely examples, and the present disclosure is not limited thereto. Any of other non-corrosive metals with suitable strength and biocompatibility, non-metal ceramic artificial bone materials, or composite combinations thereof may be applied to the fixture 210.

The fixture 210 may include a calcium phosphate-based ceramic coating layer, such as apatite hydroxide ($Ca_{10}$ $(PO_4)_6$ $(OH)_2$, HA), having excellent bioactivity on the surface of the fixture 210 to improve adhesion by promoting reactivity against the alveolar bone 101. According to another embodiment, a metal ceramic, such as $TiO_2$, $Ta_2O_5$, $Nb_2O_5$, $ZrO_2$, $SiO_2$, $RuO_2$, $MoO_2$, $MoO_3$, $VO$, $VO_2$, $V_2O_3$, $V_2O_5$, $CrO_2$, or $CrO_3$, may be coated on the fixture 210. The above-stated metals are merely examples, and one of ordinary skill in the art will understand that an arbitrary material capable of promoting osseointegration may be used as the coating material.

A long hole 211 of the fixture 210 may be formed in the body unit 213 in the depth-wise direction along the central axis CL. The intermediate structure 220 is inserted to the long hole 211. At least the lower portion of the long hole 211 may have a tapered shape, whereas the intermediate structure 220 may also have a tapered shape in correspondence to the tapered shape of the long hole 211. Vertical stress applied from the top of the implant unit 200A to the bottom of the implant unit 200A via the central axis CL may be uniformly dispersed throughout the entire lower length of the fixture 210 by a sloped surface 220S having the tapered portion of the intermediate structure 220. Therefore, the alveolar bone 101 may be protected, and thus lifespan of the implant unit 200A may be increased. Furthermore, such the sloped surface 220S may function as a limiter for restricting the intermediate structure 220 from vertically moving downward in the long hole 211 and simultaneously function as a guide for easily assembling the intermediate structure 220 to the fixture 210.

According to some embodiments, a stepped portion 213T may be formed as a portion of the body unit 213 in the long hole 211. Furthermore, a counter stepped portion 224 is formed on the sidewall of the intermediate structure 220 as a component corresponding to the stepped portion 213T, where the stepped portion 213T and the counter stepped portion 224 may be designed to form a distance of about 0.5 mm between the body unit 213 and the intermediate structure 220 when the body unit 213 is normally assembled to the intermediate structure 220. Therefore, the stepped portion 213T and the counter stepped portion 224 may cause the body unit 213 to closely contact the intermediate structure 220. The maximum diameter or width of the fixture 210 may be within a range from 3 mm to about 6 mm. The length of the fixture 210 may be within a range from 3 mm to about 15 mm.

The upper-end portion 225 of the intermediate structure 220 may protrude more than the top of the fixture 210, thereby securing an area for mounting the abutment 230. The abutment 230 may be assembled to the protruding upper-end portion 225 of the intermediate structure 220. To prevent the abutment 230 mounted on the upper-end portion 225 of the intermediate structure 220 from being rotated and slipped, the upper-end portion 225 of the intermediate structure 220 may have a polygonal cross-section, such as a rectangular cross-section, a pentagonal cross-section, or a hexagonal cross-section, or an elliptical cross-section. In this case, the bottom portion of the abutment 230 may include a groove having a corresponding shape to accommodate the upper-end portion 225 of the intermediate structure 220. For example, when the abutment 230 is mounted on the hexagonal upper-end portion 225, the abutment 230 may be limited from being rotated or slipped on the upper-end portion 225 of the intermediate structure 220 by the structures of the upper-end portion 225 and the abutment 230 corresponding to each other.

As shown in FIGS. 4 and 5, the intermediate structure 220 may include a first structure 221 formed at the lower-end portion, and the fixture 210 may include a second structure 212, which has a corresponding shape opposite to that of the first structure 221 to accommodate the first structure 221 on the inner sidewall of the fixture 210. For example, the first structure 221 may have a flange-like shape that horizontally protrudes from the lower end portion of the intermediate structure 220 in the radius-wise direction. The second structure 212 may be a trench formed on the inner sidewall of the fixture 210 to accommodate the flange-like first structure 221. According to another embodiment, the second structure 212 may have a protruding ring-like shape that protrudes from the inner sidewall of the fixture 210 toward the central axis CL. In this case, the first structure 221 may be a trench formed at the lower-end portion of the intermediate structure 220 to accommodate the protruding-ring like first structure 221.

To assemble the fixture 210 to the intermediate structure 220, the intermediate structure 220 is inserted to the long hole 211 of the fixture 210, moves toward the bottom of the fixture 210, and, when the first structure 221 of the intermediate structure 220 is accommodated in the second structure 212 of the fixture 210 or the second structure 212 is accommodated in the first structure 221, the intermediate structure 220 is coupled with the fixture 210.

The first structure 221 may have a first sloped surface 221a. The first sloped surface 221a may have a slope angle greater than an angle between the sloped surface of the tapered long hole 211 of the fixture 210 and the central axis CL and smaller than 90° to guide the intermediate structure 220 when the intermediate structure 220 moves toward the bottom of the fixture 210 along the central axis CL. The first structure 221 may further include a second sloped surface 221b. The second sloped surface 221b may have a suitable slope angle for easily assembling and detaching the intermediate structure 220 to and from the fixture 210 after the intermediate structure 220 is coupled with the fixture 210. The first sloped surface 221a and the second sloped surface 221b may have protruding shapes, such that, when the first structure 221 is cut along a plane parallel to the central axis CL, the line of intersection between the first structure 221 and the parallel plane is a straight line, a curved line, or a combination of the straight line and the curved line. Similarly, if the second structure 212 has a protruding flange-like shape, the second structure 212 may include a first sloped surface and a second sloped surface.

Although FIG. 4 exemplifies the first structure 221 and the second structure 212 as structures for assembling the fixture 210 and the intermediate structure 220 to each other, the fixture 210 and the intermediate structure 220 may further include a ring or a friction clip. Regarding the ring or the friction clip, the disclosure of Korean Patent Application No. 10-2014-0062128, which was filed on May 23, 2014 by the present applicant and is entirely included in the present specification as a reference, may be referred to.

As shown in FIG. 5, the intermediate structure 220 may include a divided rivet structure 226 formed at the lower portion thereof. The divided rivet structure 226 includes an assembling groove 222 for strongly coupling the intermediate structure 220 with the abutment 230. The divided rivet structure 226 includes a plurality of pieces 226P a certain distance apart from one another. The plurality of pieces 226P may have arc-like shapes corresponding to two, three, four, five, or more equally divided portions of a circle. According to another embodiment, the plurality of pieces 226P may have arc-like shapes corresponding to two, three, or more equally divided portions of a polygon, such as a rectangle, a pentagon, a hexagon, or a polygon with more vertices.

If the lower portion of the intermediate structure 220 has the divided rivet structure 226, while the intermediate structure 220 is guided toward the bottom of the fixture 210 to be assembled to the fixture 210, the plurality of pieces 226P are deformed to be closed in the directions indicated by the arrow A for easy assembly of the second structure 212 of the fixture 210 to the first structure 221 of the intermediate structure 220. When the first structure 221 reaches the second structure 212, the plurality of pieces 226P of the intermediate structure 220 are elastically recovered by being deformed to be opened in the directions indicated by the arrow B, and thus the first structure 221 may be coupled with the second structure 212. Furthermore, the divided rivet structure 226 of the intermediate structure 220 may allow a small displacement of the intermediate structure 220 in the long hole 211 against stress applied from the abutment 230 after the intermediate structure 220 is coupled with the fixture 210, thereby buffering or reducing the stress.

After the intermediate structure 220 is coupled with the fixture 210, a gap G may be provided between the bottom surface of the long hole 211 and the bottom surface of the intermediate structure 220. The gap G is a gap between the intermediate structure 220 and the fixture 210 that allows a small displacement of the intermediate structure 220 or, as described below, is filled with an elastic biocompatible material, thereby protecting an implant unit and an alveolar bone from harmful shocks from mastication of the food, teeth clenching, and teeth grinding.

An assembling element 240 is rotation-assembled inner sidewalls of the intermediate structure 220 and the abutment 230. The assembling element 240 may be a shortened assembling element with a relatively small length and an elongated assembling element with a relatively large length according to degree of assembly. As the assembling element 240 is rotation-assembled the intermediate structure 220 and the abutment 230, the intermediate structure 220 may be more firmly assembled to the fixture 210, and thus the fixture 210 may be more firmly assembled to an alveolar bone. Screw threads 223 and 234 may be formed on the inner sidewall of the intermediate structure 220 and the abutment 230, and a screw may be rotation-assembled to the screw threads 223 and 234 as the assembling element 240.

Figure 6:
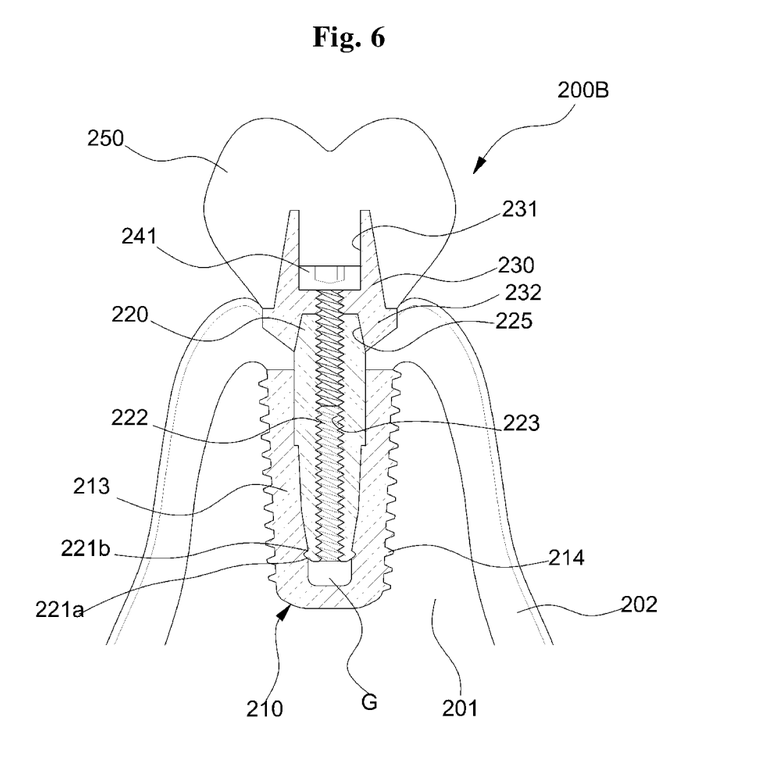
FIG. 6 is a sectional view of the implant unit according to another embodiment of the present disclosure.

FIG. 6 is a sectional view of the implant unit 200B according to another embodiment of the present disclosure, where a shortened assembling element 241 is exemplified as the assembling element 240. As shown in FIG. 6, if an alveolar bone 201 of a patient is relatively weak, the shortened assembling element 241 enables a weak coupling between the intermediate structure 220 and the fixture 210, thereby allowing a movement of the implant unit 200B within a certain range. As a result, the implant unit 200B and the alveolar bone 201 may be protected from a normal mastication or abnormal stress, e.g., stress from teeth grinding. Furthermore, since assembly between the fixture 210 and the implant unit 200B is weak immediately after the implant unit 200B is implanted to the alveolar bone 201, stress applied to the implant unit 200B may be dispersed or transmission of the stress may be partially blocked by a weak coupling based on the shortened assembling element 241. As a result, the implant unit 200B may function normally immediately after being implanted.

Furthermore, according to another embodiment, the assembling element 240 may include an elongated assembling element. The elongated assembling element may be a detachable element or an integrated element. The elongated assembling element may be rotation-assembled to the intermediate structure 220 and the abutment 230, where a terminal end of the elongated assembling element may penetrate through the intermediate structure 220 and protrude into the gap G formed between the fixture 210 and the intermediate structure 220 and coupled with the intermediate structure 220.

Figure 7:
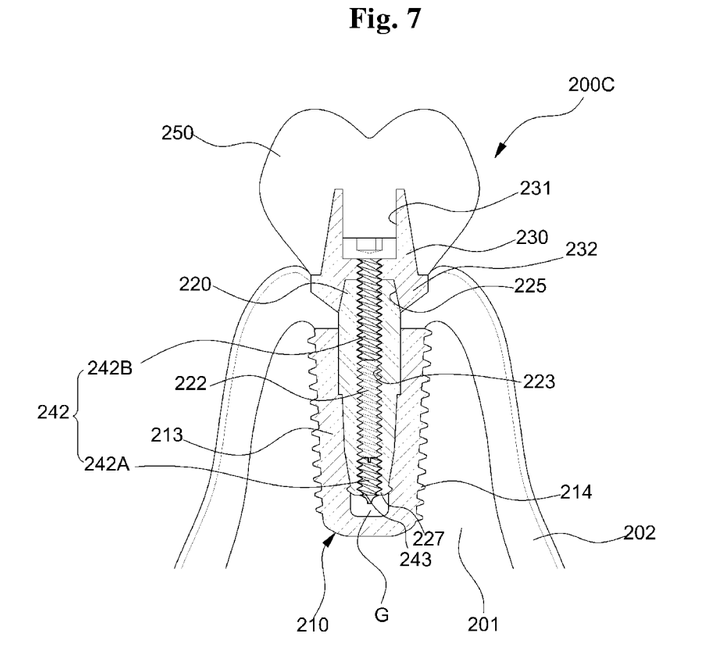
FIG. 7 is a sectional view of an implant unit according to another embodiment of the present disclosure.

FIG. 7 is a sectional view of an implant unit 200C according to another embodiment of the present disclosure, where an elongated assembling element 242 is exemplified as the assembling element 240. The intermediate structure 220 includes a bump 227 to be coupled with the detachable elongated assembling element 242 at the lower inner sidewall, and the detachable elongated assembling element 242 includes a groove 243 that is formed on the outer circumferential surface of the detachable elongated assembling element 242 and has a shape opposite to that of the bump 227 to accommodate the bump 227. As the detachable elongated assembling element 242 is coupled with the abutment 230 and the intermediate structure 220, the fixture 210 may be strongly assembled to the alveolar bone 201. The detachable elongated assembling element 242 may include a first elongated assembling element 242A and a second elongated assembling element 242B. The first elongated assembling element 242A may be rotation-assembled to the assembling groove 222 formed at the intermediate structure 220, and the bump 227 of the intermediate structure 220 may be coupled with the groove 243 of the first elongated assembling element 242A. As the groove 243 of the first elongated assembling element 242A is coupled with the bump 227 of the intermediate structure 220, the first elongated assembling element 242A may no longer move down. To rotation-assemble the first elongated assembling element 242A to the assembling groove 222 of the intermediate structure 220, a screw thread for rotation-assembly may be formed at the upper portion of the first elongated assembling element 242A. The second elongated assembling element 242B may be rotation-assembled to the intermediate structure 220 and the abutment 230.

As described above, the intermediate structure 220 may be assembled to the long hole 211 of the fixture 210 and may absorb and disperse stress transmitted from the abutment 230 and a crown 250 together with the fixture 210. The intermediate structure 220 may be formed of any one selected from among titanium (Ti), a surgical stainless steel, gold (Au), a white ceramic zirconium (Zr), and equivalents thereof. However, materials constituting the intermediate structure 220 are merely examples, and one of ordinary skill in the art will understand that an arbitrary material for absorbing and dispersing stress may be applied to the intermediate structure 220.

Furthermore, as described above, the abutment 230 may be assembled to the intermediate structure 220. The abutment 230 assembled to the intermediate structure 220 functions as a supporting element for mounting an artificial tooth or the crown 250.

The abutment 230 may be formed of any one selected from among titanium (Ti), a surgical stainless steel, gold (Au), a white ceramic zirconium (Zr), and equivalents thereof. However, materials constituting the abutment 230 are not limited thereto. For example, the abutment 230 may be fully or partially formed of a shape-memory alloy.

According to an embodiment, bumpy pattern may be provided on the upper portion 231 and/or the lower portion 232 of the abutment 230. The bumpy pattern at the upper portion 231 may improve adhesion of an artificial tooth or the crown 250 assembled thereto. The bumpy pattern on the lower portion 232 may prevent a relative rotation of the abutment 230 when the abutment 230 is assembled to the upper-end portion of the intermediate structure 220. Referring to FIG. 7, the lower portion 232 may include a bumpy pattern area for accommodating the upper-end portion 225 of the intermediate structure 220. If the upper-end portion 225 of the intermediate structure 220 is a tapered portion of which the width decreases upward, the upper-end portion 225 may increase the contact area between the bumpy pattern area of the abutment 230 and the upper-end portion 225 of the intermediate structure 220 and provides a sloped surface, thereby dispersing stress formed between the lower portion 232 of the abutment 230 and upper-end portion 225 of the intermediate structure intermediate structure 220. As a result, lifespan of the implant unit 200C may be increased and the lower portion 232 of the abutment 230 may be easily assembled to the intermediate structure 220 during an implant operation as the sloped surface functions as a guide.

An artificial tooth or the crown 250 is mounted on the abutment 230 mounted on the upper-end portion 225 of the intermediate structure 220. The abutment 230 and the intermediate structure 220 may be strongly assembled to each other via the assembling element 240.

According to the above embodiment, the intermediate structure 220 enables the fixture 210 to function immediately after the fixture 210 is implanted. Furthermore, the intermediate structure 220 may protect an implant unit and an alveolar bone from harmful shocks from mastication of the food, teeth clenching, and teeth grinding.

Figure 8:
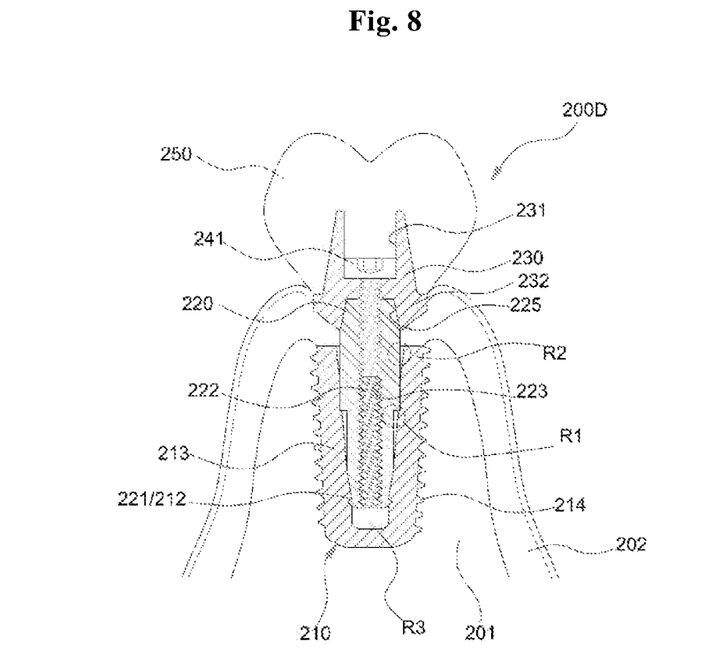
FIG. 8 is a sectional view of an implant unit according to another embodiment of the present disclosure.

FIG. 8 is a sectional view of an implant unit 200D according to another embodiment of the present disclosure. Referring to FIG. 8, the implant unit 200D may include a fixture 210 implanted to an alveolar bone 201, an abutment 230 assembled to the upper-end portion 225 of the intermediate structure 220, and an assembling element 240 for assembling the abutment 230 to the fixture 210. If the alveolar bone 201 of a patient is relatively weak, the implant unit 200D may include at least one or more gaps R1, R2, and R3 between the intermediate structure 220 and the long hole 211 of the fixture 210 to loosen the assembly between the intermediate structure 220 and the fixture 210. According to some embodiments, the gaps R1, R2, and R3 may be filled with a lubricating material for easy assembly of the intermediate structure 220 to the fixture 210 from among physiological synthetic materials. According to some embodiments, the first gap R1 may be filled with a soft tapered ring or clip or an elastic material. The second gap R2 may remain as an empty space.

The descriptions of the above-stated embodiments may be mutually compatible and may be combined with one another unless being contradictory.

According to the present disclosure, by providing an implant unit including an intermediate structure for absorbing and dispersing stress between a fixture and an abutment, the implant unit may be implanted without an additional bone grafting surgery even if a relatively large portion of an alveolar bone is absorbed. Furthermore, the alveolar bone is protected as the intermediate structure reduces stress, and thus lifespan of an implant unit is increased. Furthermore, even if a distance to a paranasal sinus (maxillary sinus) at the maxillary molar or a distance to a nerve at the mandible molar is insufficient, an implant unit may be implanted without an additional bone grafting surgery.

Furthermore, according to the present disclosure, assembly between a fixture and an intermediate structure may be improved via assembling elements of the fixture and the intermediate structure, e.g., assembly between a protrusion of the intermediate structure and a groove of the fixture for accommodating the protrusion. Furthermore, stress transmitted from the intermediate structure to the fixture may be dispersed and/or absorbed by a gap formed between the fixture and the intermediate structure, thereby improving lifespan of an implant unit. Furthermore, stress transmitted from the intermediate structure to the fixture may be dispersed and/or absorbed by a basin structure formed at the lower-end portion of the intermediate structure. Furthermore, an abutment and an intermediate structure may be strongly assembled to each other as an assembling element, such as a screw, is rotation-assembled. Particularly, in case of an elongated assembling element having a relatively large length, in addition to rotation-assembly of the elongated assembling element to an intermediate structure 220, a bump of the intermediate structure is coupled with a grooved at the terminal end of the elongated assembling element. Therefore, the abutment and the intermediate structure may be more firmly assembled. Furthermore, in case of a patient with a thin alveolar bone due to absorption of the alveolar bone or teeth with a relatively small distance therebetween, even if an implant unit having the minimum diameter is applied, stress may be efficiently absorbed and dispersed by a gap formed between a fixture and an intermediate structure, and thus reliability equal to that of an implant unit having a relatively large size may be expected.

Furthermore, according to the present disclosure, an implant unit capable of increasing lifespan of the implant unit by preventing absorption of an alveolar bone by reducing stress at a tooth neck (where the implant unit meets the gum) may be provided. Furthermore, since stress concentration may be resolved by forming the gap between the fixture and the intermediate structure, an implant unit having a relatively small diameter may be used. Therefore, an implant unit that may reduce additional surgeries, such as an additional bone grafting surgery, for reducing pain and recovery period after a surgery and surgery cost may be provided.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An implant unit comprising:
a fixture configured to assemble to an alveolar bone and comprises a long hole therein;
an intermediate structure inserted to the long hole of the fixture;
an abutment having a lower portion assembled to an upper-end portion of the intermediate structure, wherein the lower portion of the abutment includes a groove having a shape corresponding to the upper-end portion of the intermediate structure; and
an assembling element configured to couple the intermediate structure with the abutment through an assembling groove,
wherein a lower portion of an inner sidewall of the fixture has a sloped surface, a lower portion of the intermediate structure has a sloped surface, and at least a portion of the sloped surface of the long hole and at least a portion of the sloped surface of the intermediate structure contact each other,
wherein a stepped portion is provided on the inner sidewall of the fixture, and a counter-stepped portion corresponding to the stepped portion is provided on a sidewall of the intermediate structure,
wherein at least one or more gaps are formed between the fixture and the intermediate structure to loosen assembly between the intermediate structure and the fixture,
wherein the at least one or more gaps comprises:
a first gap between an under part of the stepped portion of the fixture and an under part of the counter-stepped portion of the intermediate structure; and
a second gap between an upper portion of the inner sidewall of the fixture and the sidewall of the intermediate structure,
wherein the upper portion of the inner sidewall of the fixture has a sloped surface so that a width of the second gap increases gradually toward an utmost portion of the second gap and the utmost portion of the second gap is opened between the sidewall of the intermediate structure and the inner sidewall of the fixture,
wherein the fixture and the intermediate structure are coupled with each other by a first structure formed at a lower-end portion of the intermediate structure and a second structure formed on the inner sidewall of the fixture that accommodates the first structure,
wherein the lower-end portion of the intermediate structure is divided into a plurality of pieces,
wherein the assembling groove extends to the lower-end portion of the intermediate structure,
wherein the assembling element is a shortened assembling element which does not reach the lower-end portion of the intermediate structure such that the first structure of the intermediate structure is elastically coupled with the second structure of the fixture.

2. The implant unit of claim 1, wherein the at least one or more gaps further comprises:
a third gap between the lower-end portion of the intermediate structure and the lower portion of the inner sidewall of the fixture.

3. The implant unit of claim 2, wherein the at least one or more gaps are filled with at least one of a biocompatible material, a lubricating material, or an elastic polymer.

* * * * *